No. 824,364. PATENTED JUNE 26, 1906.
J. A. KENNY & C. H. THORDARSON.
ELECTRICAL RECORDING APPARATUS.
APPLICATION FILED FEB. 24, 1903.
7 SHEETS—SHEET 1.
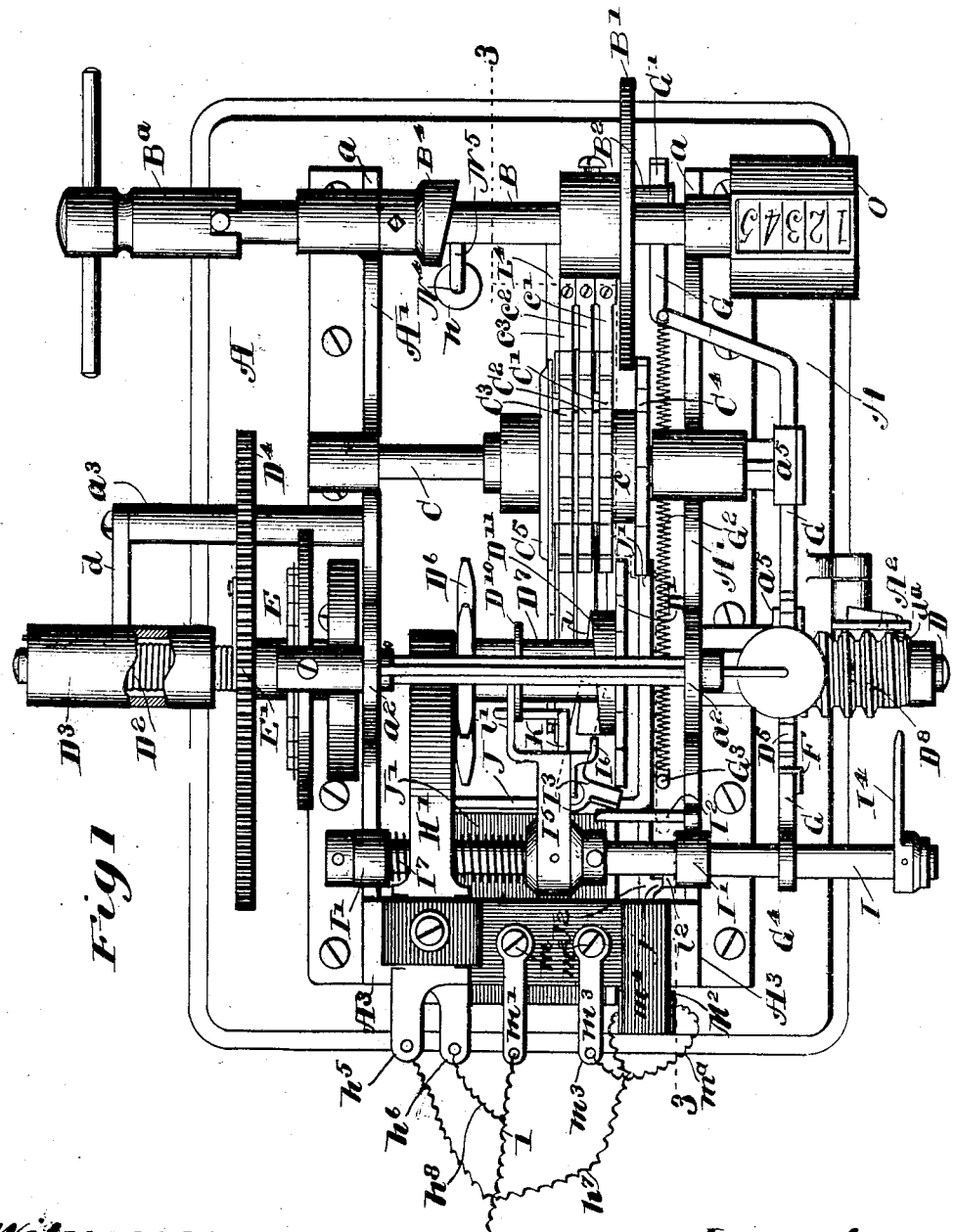
Witnesses:-
Carl H. Crawford
George R. Wilkins
Inventors:
James A. Kenny
Chester H. Thordarson
by Poole & Brown
their Attorneys

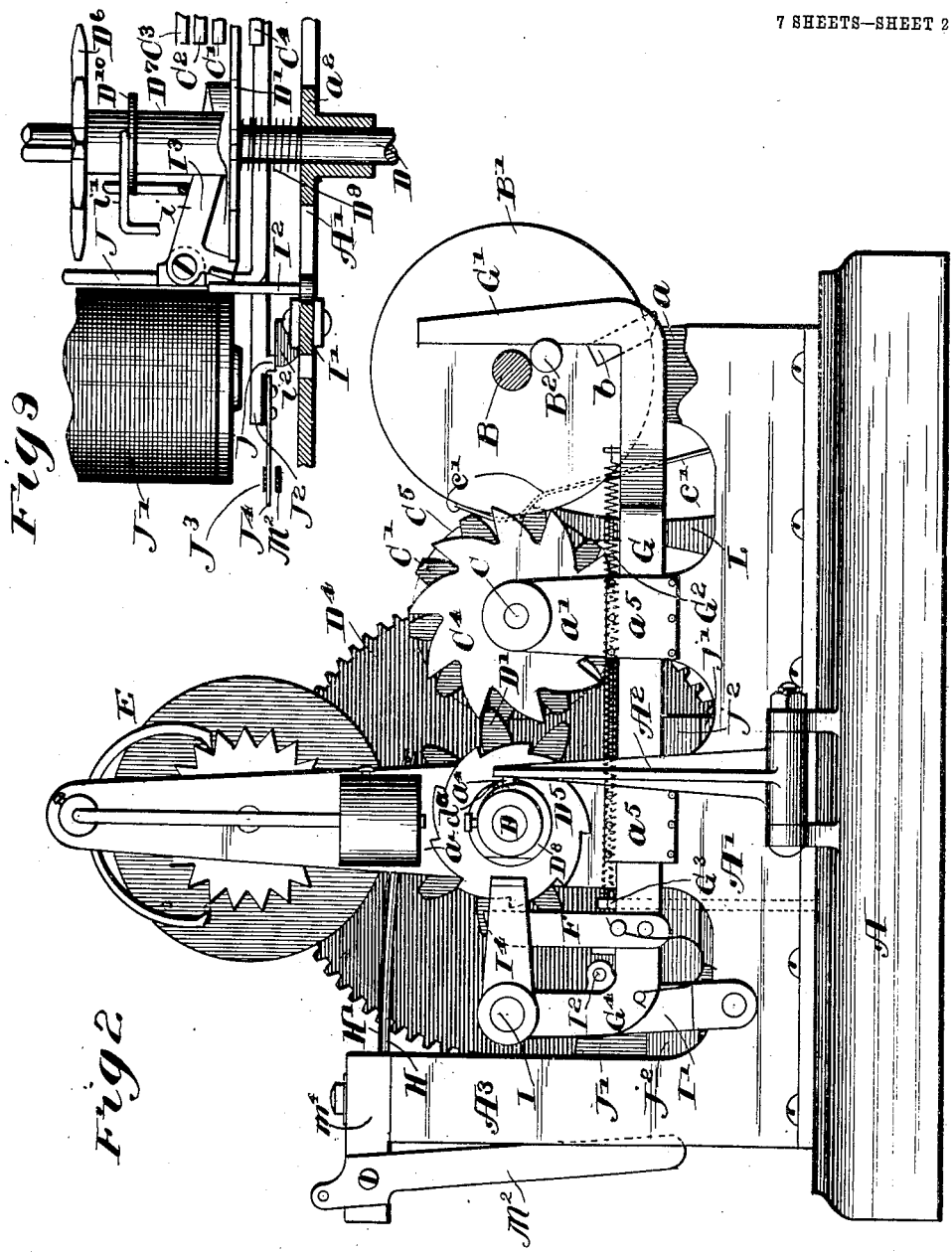

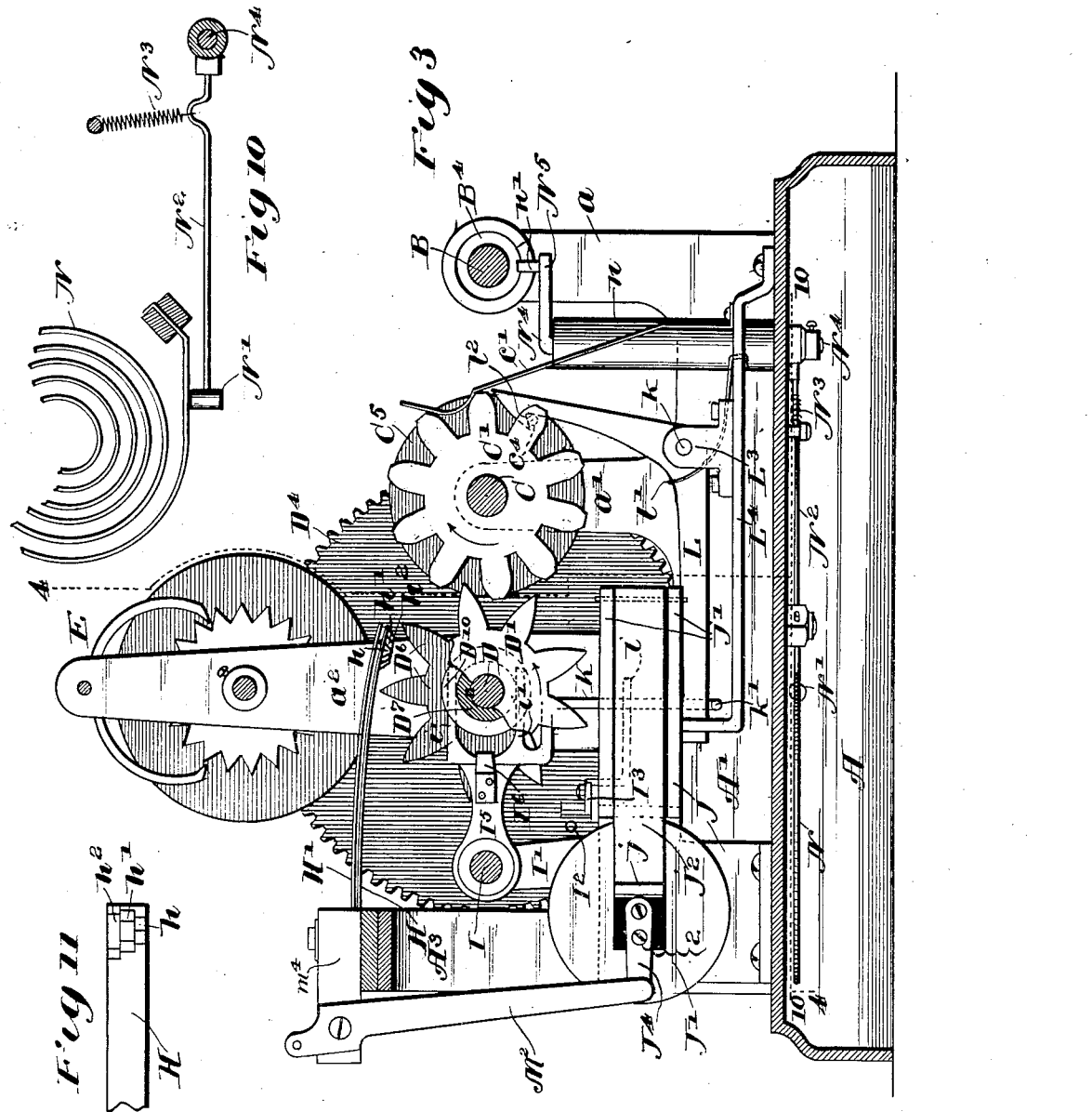

No. 824,364. PATENTED JUNE 26, 1906.
J. A. KENNY & C. H. THORDARSON.
ELECTRICAL RECORDING APPARATUS.
APPLICATION FILED FEB. 24, 1903.
7 SHEETS—SHEET 4.
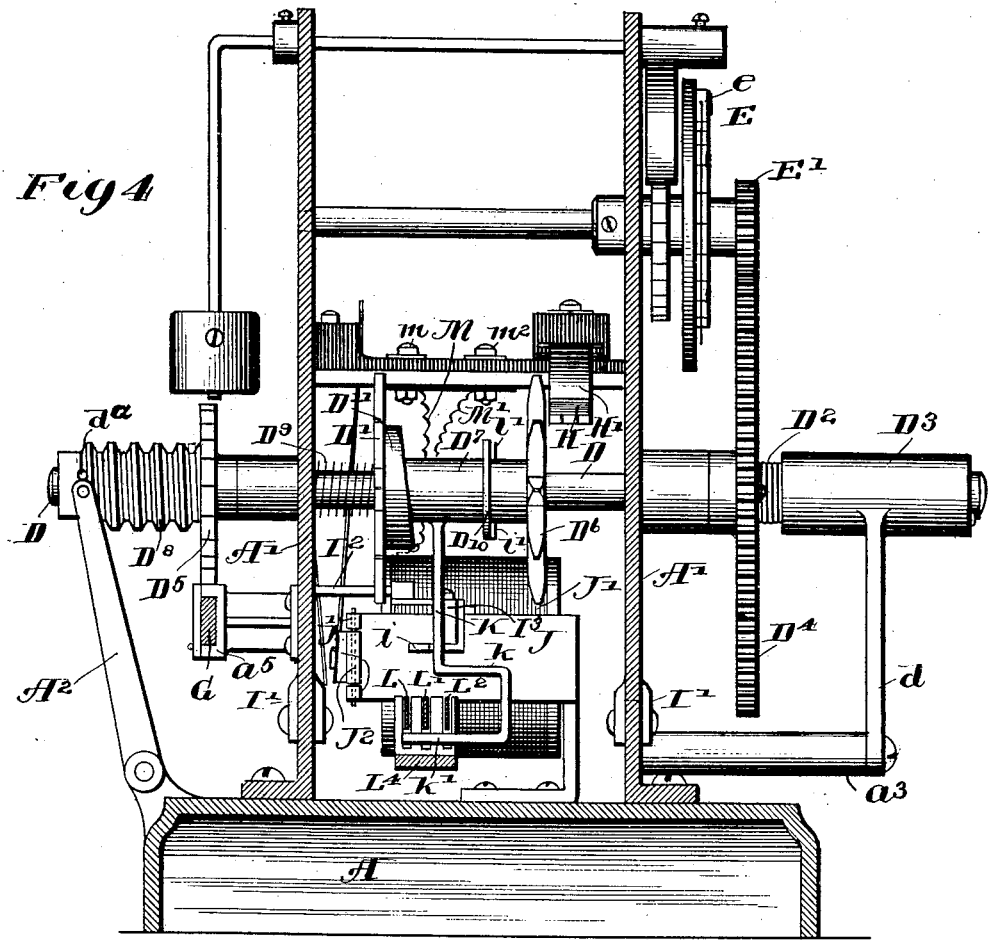
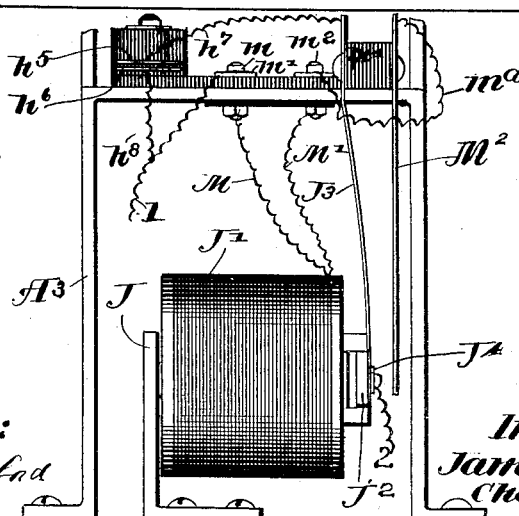
Witnesses:
Carl H. Crawford
George R. Wilkins
Inventors:
James A. Kenny
Chester H. Thordarson
by Poole & Brown
their Attorneys No. 824,364. PATENTED JUNE 26, 1906.
J. A. KENNY & C. H. THORDARSON.
ELECTRICAL RECORDING APPARATUS.
APPLICATION FILED FEB. 24, 1903.
7 SHEETS—SHEET 5.
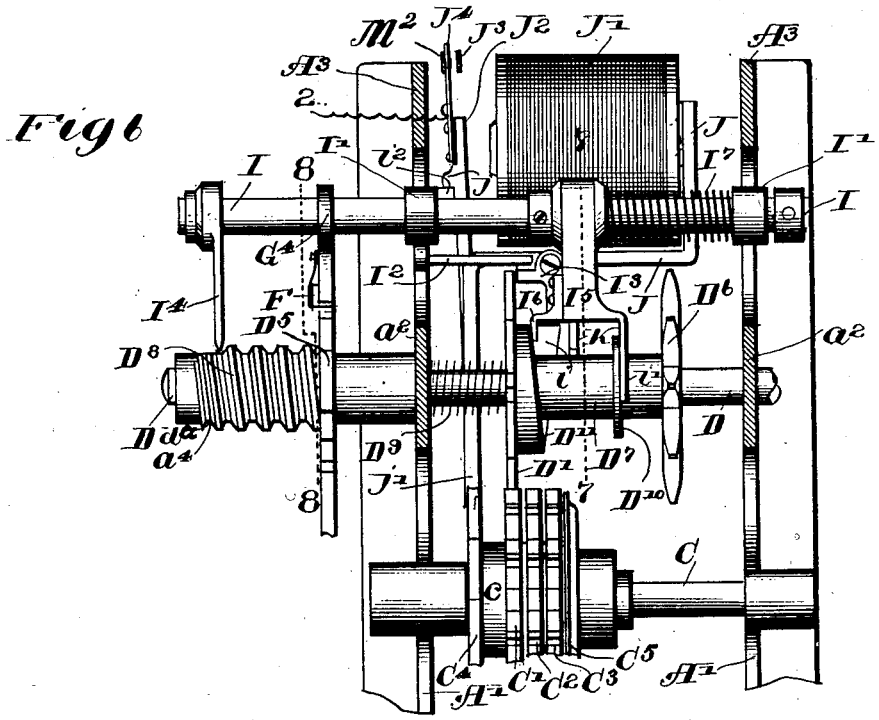
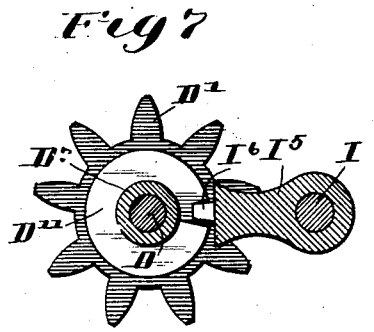
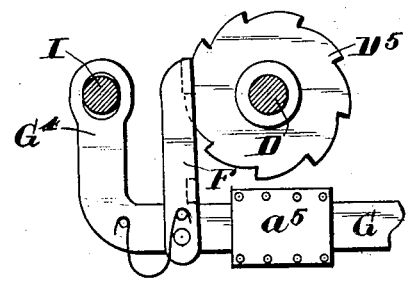
Witnesses:
Carl H. Crawford
George R. Wilkins
Inventors:
James A. Kenny
Chester H. Thordarson
by Poole & Brown
their Attorneys

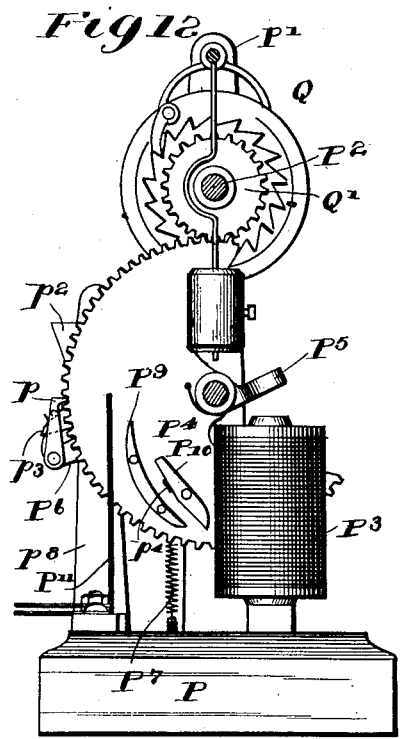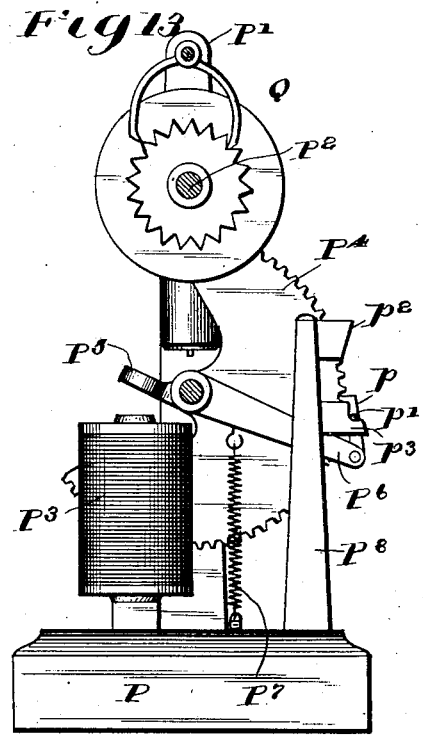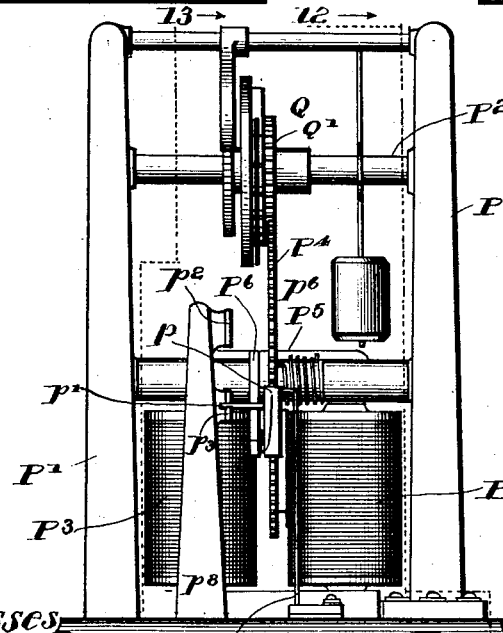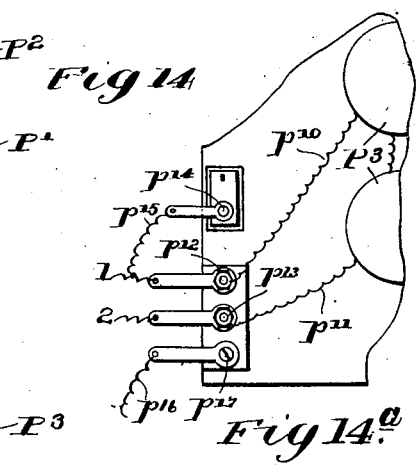

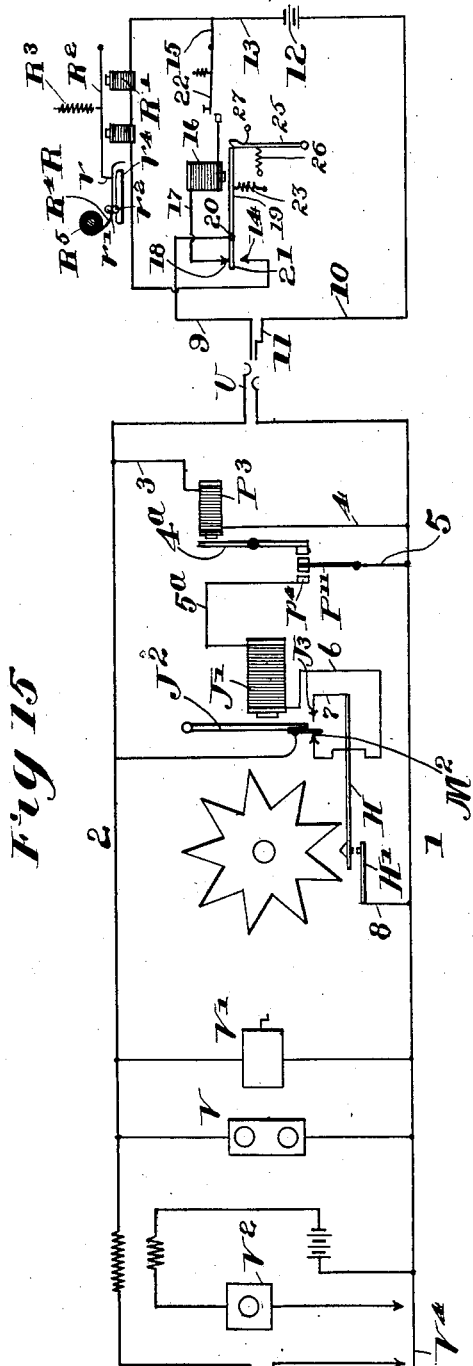

UNITED STATES PATENT OFFICE.

JAMES A. KENNY AND CHESTER H. THORDARSON, OF CHICAGO, ILLINOIS.

ELECTRICAL RECORDING APPARATUS.

No. 824,364.

Specification of Letters Patent.

Patented June 26, 1906.

Application filed February 24, 1903. Serial No. 144,727.

*To all whom it may concern:*

Be it known that we, JAMES A. KENNY and CHESTER H. THORDARSON, of Chicago, in the county of Cook and State of Illinois, have invented certain new and useful Improvements in Electrical Recording Apparatus; and we do hereby declare that the following is a full, clear, and exact description thereof, reference being had to the accompanying drawings, and to the characters of reference marked thereon, which form a part of this specification.

This invention relates to a novel electrical recording apparatus for transmiting from one or more recording devices in the nature of a meter located at an outlying station or stations records which are set up as the acts or things to be recorded are accomplished and reproducing the same graphically at a central station at certain determined intervals.

In the operation of the apparatus a record or records of certain acts and things done is set up at the outlying station or stations at the time of their performance and at a selected time such records, which are usually temporary records, are electrically transmitted to a recording device located at a central station by means enabling the operator or inspector at such central station to reproduce thereat a graphic reproduction of the temporary record or records so set up at the outlying station or stations. The temporary records so set up at the outlying station or stations may be the record or records of the number of calls made at a telephone or telephones included in a measured telephone service, the system being so arranged that at the time each call is made the subscriber produces a temporary record thereof on a suitable mechanism located at his telephone, and at certain determined intervals the records so indicated on his temporary recording device are graphically produced at the central station, such graphic production being effected by an inspector located at said central station, so that a visit of the inspector to the subscriber's telephone is made unnecessary. Other uses for the improved recording apparatus herein described is for the purpose of producing at a central station graphic records of a number of outlying gas-meters, water-meters, electric meters, and the like, or of making a record of the number of operations of a turnstile, a cash-register, or other counting devices.

In the first suggested use of the invention— to wit, the application thereof to a measured telephone service—the temporary records are set up by the subscriber himself at the time his telephone is connected with the telephone of another subscriber, and such temporary records remain intact in the temporary recording device until such time as they are transmitted to the central office and are there translated into a graphic record to indicate the number of calls made by the subscriber during the period in which such temporary records have been set up. In the application of the invention for producing graphic records of the operation of meters and other devices above mentioned, a movable part of the meter or other device acts upon the mechanism in which the temporary record is set up to operate said mechanism during each unit or cycle of movement of said device—as, for instance, during each rotation of a part of said meter or like device—and the manner of reproducing said temporary records at the central station after having been set up in the manner suggested is the same as that described in connection with the measured telephone service. The term "temporary recording device" as herein employed is intended to indicate any suitable mechanism located at an outlying station upon which are set up the parts of such record which are capable of being subsequently transmitted to a central recording device and there translated into a graphic record or one which may be visually read. The temporary records produced at the outlying station or stations may be termed "potential" records—that is to say, records while not necessarily capable of being read themselves are capable of being graphically reproduced at the central station.

The invention consists in the matters hereinafter set forth, and more particularly pointed out in the appended claims.

In the drawings, Figure 1 is a top plan view of the principal part of the mechanism located at the outlying station. Fig. 2 is a side elevation thereof with parts broken away. Fig. 3 is a longitudinal vertical section taken on line 3 3 of Fig. 1. Fig. 4 is a transverse vertical section taken on line 4 4 of Fig. 3. Fig. 5 is a detail front view of the mechanism, showing the starting-magnet and its coöperating parts. Fig. 6 is a detail top plan view of the parts located in rear of the device as shown in Fig. 1, showing said parts in changed position. Fig. 7 is a detail section taken on line 7 7 of Fig. 6. Fig. 8 is a detail section taken on line 8 8 of Fig. 6. Fig.

9 is a detail, fragmentary, plan view, showing the means for locking the device and also the means for shifting the wheels D' D⁶ laterally. Fig. 10 is a fragmentary view taken on line 10 10 of Fig. 3 looking downwardly. Fig. 11 is a detail bottom plan view of the contact-strip of the make-and-break device. Fig. 12 is a vertical section of a safety device located at the temporary recording device, taken on line 12 12 of Fig. 14. Fig. 13 is a vertical section thereof, taken on line 13 13 of Fig. 14. Fig. 14 is a rear elevation of the device. Fig. 14ª is a fragmentary diagrammatic view illustrating the wiring of the safety device. Fig. 15 is a diagrammatic view of the circuits in which the several parts of the apparatus are included. Fig. 16 illustrates one of the record-strips indicating the character of the graphic record.

First referring to the mechanism upon which the temporary records are set up, A designates the base of the device, and A' A' two lateral side members upon which the various parts of the mechanism are supported. B designates a horizontal, rotative shaft mounted in standards $a$, rising from the members A' at the front end of the device. B' designates a disk which is non-rotatively mounted on the shaft B and is provided with a projection or tooth $b$, adapted to engage with and actuate the elements of a cyclometer or denomination counting mechanism on a stationary shaft C, fixed in standards $a'$, rising from the side members of the machine. Said cyclometer mechanism consists, as herein shown, of three toothed wheels C' C² C³, which are rotatively mounted on the shaft C and are provided with internal interacting parts familiar in cyclometer construction for imparting the proper rotative movement to the wheels. The wheel C' in the present instance constitutes the units-wheel, the wheel C² the tens-wheel, and the wheel C³ the hundreds-wheel. A greater number of wheels may be employed for recording thousands and numbers of greater denominations. Said wheels are each provided with ten teeth, and the parts are so arranged that the units-wheel is first intermittently rotated an entire revolution and during the last step of its rotation carries with it the tens-wheel one step, and the tens-wheel similarly during the last step of a complete rotation carries with it the hundreds-wheel one step. The units-wheel is made integral with or attached rigidly to a sleeve $c$, upon which is integrally formed or rigidly attached a toothed wheel C⁴, which is adapted to be engaged by the tooth $b$ of the disk B,' whereby the toothed wheel and units-wheel are given a partial rotation during each rotation of said disk. The cyclometer-wheels are confined between a disk C⁵, fixed on the shaft C and engaging the hundreds-wheel and the upper end of one of the standards $a'$, which latter engages the toothed wheel C⁴. The cyclometer-wheels are held from accidentally turning through the medium of leaf-springs $c'$ $c^2$ $c^3$, which are attached at their lower ends to the base of the machine and extend upwardly and are suitably shaped at their upper ends, Fig. 2, to enter the spaces between adjacent teeth of the wheels.

D designates a horizontal rotative shaft located in front of the shaft C and mounted in standards $a^2$, rising from the side frame members A'.

D' designates a toothed wheel which is non-rotatively mounted on the shaft D, but is free to slide endwise thereon, and said wheel D' is adapted to mesh with either of the cyclometer-wheels C' to C³, it being for this purpose adapted to be laterally shifted, by a suitable mechanism hereinafter to be described in line with either of the cyclometer-wheels. Said wheel D' is located normally in line with the space between the toothed wheel C⁴ and the adjacent units-wheel C' of the cyclometer mechanism, as clearly shown in Fig. 1, and means are provided which are set in motion at the beginning of the rotation of the starting-shaft B, which acts to shift the said toothed wheel D' into mesh with the units-wheel of the cyclometer mechanism before angular movement is imparted to said cyclometer-wheel. With this construction it will be observed that each step-by-step movement of the units-wheel (and the same is true of the tens and hundreds wheels) the shaft D will be rotated through the medium of the wheel D' an angular distance equal to the extent of angular movement of the cyclometer-wheel—that is to say, each cyclometer-wheel is moved through one-tenth of its rotation during each rotation of the starting-shaft B, and one-tenth of a rotation therefore is imparted to the shaft D. Any other extent of angular movement may be imparted to the shaft depending upon the number of teeth of the cyclometer-wheels and wheel D'. Said shaft D is rotated in the manner described against the action of a spring D², which, as herein shown, surrounds one end of the shaft and is attached at one end to a sleeve D³, surrounding the outer end of the shaft D and attached to the frame by an angular arm consisting of the parts $a^3$ and $d$, Figs. 1 and 4, while the other end of the spring is attached to a large gear-wheel D⁴, non-rotatively fixed on the shaft D. The spring D² constitutes a restoring-spring, which restores the parts to their normal positions when the record set up on the device is to be transmitted therefrom. A stop is provided for finally arresting the restoring movement of the shaft D, which consists of a stop-bar A², which is hinged at its lower end to the base A beneath the shaft D to swing laterally and is provided at its upper end with a laterally-directed pin $a^4$, which travels in a coarse screw-thread D⁸ on the end of the shaft D, the hinged connection of the bar with the base enabling it to follow the screw-thread. The pin $a^4$ strikes a stop-pin $d^a$ at the outer end of the screw-thread and arrests the movement of the shaft. The return or reverse rotation of said shaft D is controlled in order to give a uniform speed to such movement by means of escapement mechanism, (indicated as a whole by the letter E.) The escapement mechanism is operatively connected with the gear-wheel $D^4$ by a gear-pinion E'. Such escapement mechanism may be of any of the familiar types and need not be further described. The said rotary shaft D is locked after each step of its rotation or angular advance by means of a spring-pressed pawl F, Fig. 1, which is pivoted at its lower end to an endwise reciprocatory bar G, which slides in suitable guides $a^5$, projecting laterally from the side frame of the device, Figs. 1 and 2. The pawl F is adapted for locking engagement with a notched wheel $D^5$ on the end of the shaft D adjacent to the bar G, and the pawl is out of engagement with the wheel $D^5$, excepting when the records are being set up on the device. The forward end of said sliding bar G is provided with an upturned portion G', which is located just in front of the shaft B and at one side of the disk B' of said shaft. Said upturned portion of the bar is adapted to be acted upon by a pin $B^2$ on the disk B', placed eccentrically to the shaft B, whereby during the first rotation of the said shaft the pin $B^2$ acts on said upturned part G' to shift the bar G forwardly, and thereby move the pawl F into locking engagement with the wheel $D^5$. The said bar and detent-arm are locked in these positions by means hereinafter to be described. In the continued rotation of the shaft B the upturned arm of the bar G is held away from the pin $B^2$, so that said pin clears said upturned part of the bar. When the starting-shaft B therefore is turned to operate the cyclometer mechanism in the manner before described, it acts, through the pin $B^2$, to shift the bar G endwise and move the upper end of the spring-pressed pawl F into locking engagement with the wheel $D^5$. Said pawl yields away from the wheel $D^5$ to permit the shaft D and said wheel to be subsequently rotated, but prevents reverse rotation of said parts until the pawl is bodily shifted rearwardly therefrom. When the locking means for said bar are released, the bar and the pawl F are restored under the action of a spiral contractile spring $G^2$, which is attached at its rear end to a pin $G^3$, rising from the base of the device, and at its forward end to the bar G, as shown in Fig. 1.

Connected with the wheel D' by a sleeve $D^7$, which surrounds the shaft D, is a star-wheel $D^6$, which constitutes part of, or operates, an electrical make-and-break device, whereby during the restoring movement of the shaft D recording-impulses are transmitted to the central recording device, which are there translated into a graphic record. The other parts of the make-and-break device consist of two normally separated and insulated strips H H', supported at their rear ends upon a frame $A^3$, rising from the base of the device and overhanging the star-wheel. The strips are provided on their adjacent sides with contact-pieces, which are brought together when the strip H is raised by contact therewith of one of the teeth of said wheel. Said strips H H' are included in the transmitting-circuit, hereinafter described, and the make-and-break between said strips produces impulses in the transmitting-circuit which are translated by the central recording devices to produce a record in accordance with said impulses. The lower strip H is provided with three laterally-separated contact-pieces $h\ h'\ h^2$, one for each cyclometer-wheel $C'\ C^2\ C^3$, and the star-wheel $D^6$ is shifted laterally, together with the toothed wheel D', so that when the wheel D' is in mesh with either one of the cyclometer-wheels the star-wheel is in position for contact with one of the contact-pieces $h\ h'\ h^2$, which is appropriated to or corresponds with said cyclometer-wheel. The contact-pieces $h\ h'\ h^2$ are made of gradually-increasing width, the one appropriated to the units-wheel being the shortest and the one appropriated to the hundreds-wheel being the longest, while the one appropriated to the tens-wheel is of an intermediate length. In this manner impulses of different lengths are produced by the make-and-break device in the restoring movement of the shaft D and star-wheel $D^6$, depending upon the cyclometer-wheel with which the toothed wheel D' is in mesh and also the contact-piece with which the star-wheel has contact, and the central recording device is so constructed as to produce marks on the record-sheet of a length corresponding with the impulses. With this arrangement the marks produced on the record-sheet at the central office are dots when the toothed wheel is in mesh with the units-wheel in the restoring movement of the parts, are dashes when said toothed wheel is in mesh with the tens-wheel, and longer dashes when the toothed wheel is in mesh with the hundreds-wheel. The strips H H' are cut out of the transmitting-circuit when the record is being set up, so that notwithstanding the fact that the star-wheel brings the contact-pieces of the strips together in the setting-up movement thereof no effect is produced to operate the central recording device.

When the parts of the machine are in their starting positions, the toothed wheel D' is located between the toothed wheel $C^4$ and the units-wheel C'. When the device is brought into operation through the medium of the starting-wheel B', (which may be effected through the medium of the key $B^a$, if the device is to be manually operated,) said wheel D' is first moved laterally on the shaft D by suitable mechanism hereinafter to be described to bring the same into mesh with the units-wheel. Just as the units-wheel is completing the ninth step in its rotation it is locked to the tens-wheel to advance it one step; the first step of the tens-wheel occurring as the tenth step of the units-wheel is taking place. Just after the ninth advance step of the units-wheel takes place the toothed wheel D' is moved laterally into mesh with the tens-wheel. Similarly, just as said tens-wheel of the cyclometer has completed the ninth step of its rotation it is locked to the hundreds-wheel to advance the same one step, and just before the hundreds-wheel advances the toothed wheel D' is shifted laterally into mesh with the hundreds-wheel, so that in the subsequent angular advances of said hundreds-wheel the wheel D' and shaft D are correspondingly angularly advanced. It will thus be seen that the shaft D is angularly advanced ten steps during each rotation of the units-wheel and to the same extent for each rotation of the tens and hundreds wheels. The said toothed wheel D' is forced laterally into contact with the units-wheel and is held therein during the complete rotation of said units-wheel and is thereafter forced into mesh with the tens and hundreds wheels and held in mesh therewith during the complete rotation of said wheels by the following mechanism.

The sliding bar G is provided at its rear end with an upturned portion $G^4$, the upper end of which is apertured to receive a horizontal shaft I. Said shaft I is mounted in the upper ends of oscillatory bearing-standards I I', one at each side of the device at the rear end thereof and hinged at their lower ends to the base A. Said shaft I is adapted to slide endwise through the apertures in the upper ends of said standards I'. Attached to the left-hand standard I' is an inwardly-extending pin $I^2$, which is disposed parallel with said shaft. Said pin $I^2$ is adapted to engage at its inner end a lug on a horizontally-swinging lever $I^3$, pivoted on a frame J of an electromagnet J', located at the rear of the machine, for a purpose hereinafter to be described. Said lever $I^3$ extends forwardly and downwardly and the lower rear end $i$ of said lever extends at one side of a vertical arm K, which is attached at its upper end to the sleeve $D^7$ on the shaft D and extends downwardly therefrom in the manner clearly shown in Fig. 4. With this construction when the initial starting-shaft B is rotated the bar G is shifted forwardly in the manner before described, causing the locking detent-arm F to be engaged with the notched wheel $D^5$ in the manner hereinbefore described, and said bar also acts through the upturned part $G^4$ of the bar to shift the shaft I forwardly and to swing the oscillating standards I' on their hinges. As the pin $I^2$ is attached to one of said standards it is also swung forwardly and is brought into contact with the upper end of the lever $I^3$, thereby swinging said lever toward and against the arm K and through said parts shifting the sleeve $D^7$ and integral wheels D' $D^6$ laterally, so as to bring the wheel D' into mesh with the units-wheel of the cyclometer mechanism to be thereafter rotated by said wheel.

The parts are locked in the positions described by the following means: The left-hand oscillating standard I' is provided with a locking-lug $i^2$, adapted to engage a lug $j$ on the swinging armature $J^2$ of the electromagnet J' when said standard is swung forwardly in the manner described. Said armature is pivotally mounted on a forwardly-extending part $j'$ of the magnet-frame J and is spring-pressed to swing it laterally away from the magnet. When, therefore, the standard I' adjacent to said armature is swung forwardly to carry the lug $i^2$ past the lug $j$, the said lug $j$ is snapped into locking engagement with the lug $i^2$ and locks the parts. The parts are unlocked by energizing the magnet and drawing the armature toward the magnet and the lug $j$ away from the lug $i^2$.

The mechanism which operates in conjunction with the mechanism just described for shifting the toothed wheel D' into mesh with the tens-wheel after the ninth step of the rotation of the units-wheel and for shifting the wheel into mesh with the hundreds-wheel after a like extent of movement of the tens-wheel is made as follows: The endwise-movable shaft I, hereinbefore mentioned, is provided on its end adjacent to the screw-thread $D^8$ on the shaft D, before mentioned, with a rigid arm $I^4$, which extends toward said screw-thread and which when said shaft is shifted forwardly in the manner just described, is brought with its extreme end into mesh or contact with said screw-thread. It will be observed, therefore, that as the shaft D is rotated it will cause the shaft I to be moved endwise. Such endwise movement of the shaft I is resisted by a spiral expansion-spring $I^7$, interposed between one of the standards I' and a forwardly-extending arm $I^5$, the function of which will hereinafter more fully appear. A spring $D^9$ is interposed between one of the side members A' and the toothed wheel D' and tends to shift the said wheel laterally toward the cyclometer-wheels. The forwardly-extending arm $I^5$ of the shaft I is provided at its forward end with fingers $i'$ $i'$, which pass one above and one below the sleeve $D^7$, surrounding the shaft D, and bear laterally against an annular, radially-extending flange $D^{10}$ on said sleeve. The spring $D^9$ acts, when the toothed wheel D' is first shifted into mesh with the unit cyclometer-wheel, to press said flange $D^{10}$ against the fingers of said arm $I^5$, said wheel D' being thus held in proper lateral mesh with said cyclometer-wheel, as clearly shown in Fig. 6. In the continued rotation of the units-wheel of the cyclometer which meshes with the toothed wheel D' aforesaid, the said shaft D is turned an angular distance corresponding with that of the cyclometer-wheel. The screw-thread $D^8$ turns with said shaft D and acts on the arm $I^4$ to shift the shaft I endwise, and in this manner acts to move the fingers $i'$ of the arm $i^5$ away from the flange $D^{10}$ of the sleeve $D^7$, so that it is necessary to provide means for preventing the said sleeve shifting on the shaft D under the influence of the spring $D^9$ and for preventing the toothed wheel D' on said sleeve from shifting out of mesh with the units cyclometer-wheel until said wheel has almost completed its rotation. Said wheel is held in its proper meshing position with the unit during the complete rotation of said units-wheel by the following devices: $I^6$ designates a lug on the arm $I^5$, (or it may be on the shaft I,) which engages a cam $D^{11}$, formed on the inner face of the toothed wheel D', and the pitch of said cam is equal to the pitch of the screw-thread $D^8$, so that notwithstanding the shifting of the fingers of the arm $I^5$ away from said flange $D^{10}$, the engagement of said lug $I^6$ with said cam $D^{11}$ acts to hold the sleeve $D^7$ and toothed wheel D' from shifting laterally until the cyclometer units-wheel has completed the ninth step of its rotation. A space is provided between the flange $D^{10}$ and the star-wheel $D^6$ of such width as to permit the fingers $i'$ to shift relatively to said sleeve $D^7$ to the required extent. When said units-wheel has completed its ninth step, the lug $I^6$ passes off of the highest part of the cam $D^{11}$ to the lowest part thereof and permits the wheel D', under the influence of the spring $D^9$, to shift laterally a distance to bring it into mesh with the tens-wheel of the cyclometer. Such movement of the wheel D' and its sleeve $D^7$ is arrested by contact of the flange $D^{10}$ of the sleeve $D^7$ with the fingers $i'$ of the arm $I^5$. The wheel D' is thus held at this time between the spring $D^9$ and the fingers $i'$ in proper lateral meshing relation with respect to the tens-wheel until said tens-wheel almost completes a rotation, the lug $i^6$ and cam $D^{11}$ acting in the manner before described to hold the wheel D' engaged with said tens-wheel while the shaft I continues to shift endwise. After the tens-wheel has completed its ninth step the lug $I^6$ drops from the highest part of said cam $D^{11}$ to the lowest part thereof and permits the toothed wheel D' to shift laterally into meshing engagement with the hundreds-wheel of the cyclometer and is held in this position by the same means which hold it in meshing relation to the tens-wheel. During all this time the shaft I is prevented from being restored to its original or starting position, which the spring $I^7$ tends to do, by reason of the fact that the arm $I^4$ of said shaft is maintained in engagement with the screw-thread $D^8$ on the shaft D.

When the operation of the temporary recording device is first started by the rotation of the shaft B and the shaft I is shifted toward the shaft D to bring the arm $I^4$ into engagement with the screw-thread $D^8$ on said shaft D and to shift the toothed wheel D' into engagement with the units-wheel of the cyclometer mechanism by means of the lever $I^3$, to which reference has been made, and also to bring the locking-detent arm F into locking engagement with the locking-wheel $D^5$ on the shaft D before described, said parts are locked in these positions by engagement of the lugs $i^2$ and $j$ on the standard $I'$ and armature $J^2$, respectively, as before mentioned. When said magnet is energized, the lug on the armature is drawn away from the lug $i^2$ on the bearing-standard $I'$ and allows the shaft I and its bearing-standards to be swung rearwardly away from the shaft D through the action of the spring $G^2$ on the sliding bar G, thereby releasing the arm $I^4$ from the screw $D^8$ and permitting the shaft I to be restored or partially restored, as the case may be, under the action of the spring $I^7$ and also withdrawing the locking-detent arm F from the locking-wheel $G^5$ on the shaft D to permit said shaft D to be restored under the action of its spring $D^2$. The restoring movement of said shaft D gives rotation to the toothed wheel D' and also gives like rotation to the star-wheel $D^6$ to operate the make-and-break device to transmit registering impulses from the temporary recording device to the recording device located at the central station. The toothed wheel D' in its return movement acts to return to zero the cyclometer-wheel with which it may be at this time in mesh. It is not intended, however, that each of the cyclometer-wheels shall be rotated backwardly by the toothed wheel D' a like number of revolutions and partial revolutions which they have been advanced, but said cyclometer-wheels are merely returned to their zero positions, and after each wheel has been thus returned to zero the toothed wheel D' is shifted into mesh with the next lower wheel and returns it to zero if it is not already standing at zero, and when all of the wheels have been returned to zero the toothed wheel takes its position between the units-wheel and the toothed wheel $C^4$, as shown in Fig. 1. In other words, it is not intended that all of the cyclometer-wheels shall be given an extent of reverse movement by the toothed wheel D' the same as they have been advanced, but said wheels are only returned from the angular positions which they chance to occupy at the time a record is to be taken off to the zero-points. The mechanism for effecting this result is made as follows: Each of said cyclometer-wheels is provided on its side face with a laterally-extending pin $c^4$, (shown on one of the wheels in Fig. 3,) and when the pins of said wheels reach a given point in their circular paths of movement they are assumed to be at zero. L L' L² designate three L-shaped levers, which are pivoted at their angles on pivot-pins $l$, extending through said levers and through lugs L³, supported on a horizontal bracket L⁴, extending from front to rear of the machine, the horizontal members of said levers extending transversely beneath the shafts C and D. The vertical members of the levers extend upwardly from their pivots in front of the shaft C and one at the side of each of the cyclometer-wheels. Said vertical members of the levers are provided with notches $l^2$, as shown in Fig. 3, which are adapted to be engaged by the pins $c^4$ of the cyclometer-wheels when said cyclometer-wheels are at zero. Said levers are placed under the influence of springs $l'$, as shown in Fig. 3, which tend to normally hold the horizontal members of the levers downwardly and to throw the vertical parts thereof rearwardly. The arm K, which extends downwardly from the sleeve D⁷, as before described, and by which the sleeve and wheel D' are initially shifted laterally to engage said wheel with the units cyclometer-wheel, is provided with an extension or tailpiece $k$, which is directed laterally and downwardly, and the extreme end $k'$ of said tailpiece is adapted to extend horizontally beneath the rear ends of the horizontal members of the levers L L' L² when the rear ends of said levers are in their uppermost positions, as shown in Figs. 3 and 4. Such positions of the levers occur when the cyclometer-wheels are at zero and the pins $c^4$ are engaged with the notches $l^2$ of said levers, the tension of the spring D² of the shaft acting at this time to throw the upper ends of the vertical members of said levers forwardly and the rear ends upwardly. The operation of this feature of the device is as follows: If it be assumed that the device is in its starting position and all of the cyclometer-wheels at zero and the units-wheel be angularly advanced in setting up the first record, said wheel is turned in the direction indicated by the arrow in Fig. 3 and the pin $c^4$ thereof is moved away from the notch $l^2$ of its lever L. The upper end of said lever being freed, the rear end of the horizontal member of the lever is thrown downwardly under the action of its spring $l'$. Just before the first record has been set up on said units-wheel the toothed wheel D' and connected sleeve D⁷ have been shifted laterally in the manner hereinbefore described, and the sleeve carries with it the arm K in a manner to bring its tailpiece laterally from beneath the horizontal member of the units-lever L. After the rear end of said lever drops, therefore, it constitutes a stop which coacts with said tailpiece of the arm K and prevents retraction of the sleeve and wheel D' until said lever is raised. So long as the parts are in these positions, therefore, it will be obvious that the toothed wheel D' cannot be laterally retracted out of mesh with the units cyclometer-wheel until the horizontal member of the lever is again raised, and such raising of the horizontal member of the lever will occur when in the restoration of said units-wheel the pin $c^4$ thereof engages the notch $l^2$ of the vertical member of the lever and throws the horizontal member thereof upwardly. At this time the tailpiece $k'$ of the arm K is free to pass beneath the horizontal member of the lever L, thereby permitting the restoration of the toothed wheel D' to its starting position. In like manner with the tens and hundreds cyclometer-wheels the horizontal members of the levers L' L², associated with the wheels C² C³, are forced downwardly under the action of the springs $l'$ as soon as the pins $c^4$ of said wheels are moved out of engagement with the notches $l^2$ of the vertical members of the L-shaped levers associated therewith, and said levers constitute stops which coact with the tailpiece of the arm K to prevent retraction of the wheel D' from said wheels C² C³ until said latter wheels are restored to zero and the pins $c^4$ again brought into engagement with the notches of the vertical members of said levers. It is to be understood that the lever associated with each of the cyclometer-wheels will not be operated to throw its rear end downwardly until the wheel associated therewith begins to advance—that is to say, just as each wheel has made a complete rotation and it picks up the next higher wheel during the tenth or final step thereof such movement of the newly-started wheel throws the pin $c^4$ thereof out of engagement with the associated stop-lever and permits the rear end of said lever to drop. Just prior to this time, however, the toothed wheel D' has been moved into mesh with said next higher wheel and has carried the tailpiece of the pin K laterally from beneath the horizontal member of its associated lever, whereby when said horizontal member of the lever has dropped downwardly it is located in the path of said tailpiece and prevents its return movement until the lever is again thrown upwardly, which will occur when the said newly-started wheel has been returned to zero and the pin $c^4$ thereof is engaged with the notch in the vertical member of its lever. The same operation occurs with each of the cylometer-wheels. The mechanism just described is designed to produce a record when the parts are restored which shall group the record characters representing the different denominations composing the number in such manner that the record shall show as many characters for each denomination as there are multiples of the several denominations represented in the record-number. The manner in which this mechanism operates to produce such a record will be understood from a consideration of the following: If it be assumed that eleven records have been set up on the cylometer-wheels, it will be observed that the units-wheel has been advanced one step farther than a complete rotation, so that its pin $c^4$ is one step out of engagement with its associated lever L and the rear end of the horizontal member of said lever is lowered into its stopping position. The tens-wheel has been turned but a single step in advance from its starting or zero position and the rear end of its associated lever L' is depressed into the path of the tailpiece of the arm K. If the parts be released at this time to be restored under the action of the spring $D^2$ of the shaft D, the wheel D' of said shaft is held in mesh with the tens-wheel until one retrograde step has been made, and such step restores the tens-wheel to zero and brings the pin $c^4$ of said wheel into engagement with the notch $l^2$ of its lever L'. During the time the wheel D' is retrograding in mesh with the tens-wheel the star-wheel $D^6$ is in line with the intermediate contact-piece $h'$ of the make-and-break strip H, and one tooth of said wheel engages said contact-piece and closes the transmitting-circuit between said strips H H' and produces an impulse corresponding in length to that of said contact-piece $h'$. Such impulse produces a dash at the central station indicating a tens-record. The tens-wheel is thereby arrested, and the pin $c^4$ thereof acts upon said lever to raise the rear end thereof out of the path of the tailpiece of the arm K and permits the wheel D' to be moved by the spring $I^7$ laterally into mesh with the units-wheel and the star-wheel laterally into line with the shortest or units contact-piece $h$ on the strip H of the make-and-break device. After the wheel D' is shifted into mesh with the units-wheel and the star-wheel $D^6$ into line with the shortest contact-piece $h$ the retrograde movement of the parts is continued, the first effect of which is to restore the units-wheel one step to zero and at the same time close the circuit between the strips H H' of the make-and-break device and send an impulse over the transmitting-circuit which is translated as a units-record. Upon the completion of the said retrograde step of the units-wheel the said units-wheel is arrested, and the pin $c^4$ thereof acts upon the lever to throw the rear end of the lever L upwardly out of the path of the tailpiece of the arm K and the wheel D' is moved laterally out of mesh with the units-wheel and the star-wheel is moved laterally out of line with the unit contact-piece of the strip H of the make-and-break device under the action of the spring $I^7$ to the position shown in Fig. 1. It will be observed that the shaft D and wheels D' $D^6$ have been advanced eleven distinct steps during the setting up operation of the record—that is to say, the shaft D has been rotated forwardly one and one-tenth times. In the restoring movement of the shaft but two of the eleven steps are employed to effect the closing of the transmitting-circuit, and when the wheel D' is shifted out of mesh with the units-wheel it is free to turn backwardly to its zero position without further closing the transmitting-circuit, the star-wheel being shifted out of line with the strip H of the make-and-break device simultaneously with the shifting of the wheel D' out of mesh with the units-wheel. If ten instead of eleven records be set up on the temporary registering device, but a single impulse will be sent out over the transmitting-circuit. This is due to the fact that inasmuch as the units-wheel stands at zero at the end of ten advance steps, or a complete rotation, the lever L associated therewith is raised out of the path of the tailpiece of the arm K, so that when the toothed wheel D' is released from mesh with the tens-wheel it is shifted past the units-wheel to its starting position. If the number of records set up be one hundred and eleven, the first effect of the retrograde movement of the toothed wheel D' (which is at this time in mesh with the hundreds wheel) is to restore the hundreds-wheel to zero, producing at the same time a closing of the transmitting-circuit a length of time corresponding with the length of the hundreds contact-piece $h^2$ of the strip H, and thereafter the wheel D' is shifted into mesh with the tens-wheel. The subsequent operation is the same as that heretofore described. It will of course be understood that records represented by numbers comprising multiples of each of the denominations referred to are set up and taken off from the temporary registering device in the same manner as hereinabove described, with the exception that the toothed wheel D' remains in mesh with the various denomination-wheels of the cyclometer mechanism and the star-wheel remains in line with the corresponding contact-pieces of the strip H a greater length of time, depending upon the steps the pins $c^4$ of the counting-wheel travel before reaching zero and the number of records to be transmitted and recorded, the shifting of the toothed and star wheels being accomplished in the identical manner as hereinabove described. In this manner it is practicable to produce a much more compact and easily-read record, for obviously such record may be read much more quickly than if the number of impulses produced in transmitting the record to the recorder be equal to the number of independent advancements made by the counting mechanism when said records are set up in the temporary recording device. Moreover, the time in which the records are read is greatly shortened as compared to a device wherein the number of recording impulses sent out to line therefrom are equal to the number of independent advancements of the temporary recording device.

An illustration of the record produced is shown in Fig. 16, wherein is illustrated the record, which is shown as transcribed on a strip by a recording device in the manner of a ticker and is indicated by eight characters—to wit, one long dash, indicating hundreds, two shorter dashes, indicating tens, and five dots, indicating units. The record reads one hundred and twenty-five—that is to say, a single hundreds character, two tens characters, and five units characters.

The electromagnet J' is included in a starting-circuit which is normally open and which is momentarily closed to release the parts to permit restoration thereof under the action of the spring $D^2$ of the shaft D when a reading is to be taken from the temporary register. The strips H H' are included in a transmitting-circuit which is also normally closed, but is open just after the starting-circuit is closed. As herein shown, the closing of the transmitting-circuit is effected by the same means which opens the starting-circuit. The electrical connection between the various parts of the device is as follows: One end of the coil of said magnet J' is connected by a wire M with a binding-screw $m$ on the top of the frame $A^3$, and one of the line-wires, 1, is connected with said binding-screw through the medium of a strip $m'$. As will hereinafter more fully appear, the binding-screw $m$ is connected with the line-wire 1 through the medium of a safety device, hereinafter to be described. Likewise the other end of the coil is connected by a wire M' with a similar binding-screw $m^2$. Said binding-screw $m^2$ is connected through the medium of a strip $m^3$ and wire $m^3$ with a vertical strip $M^2$, Figs. 1 and 6, which is attached to a block $m^4$, supported on the frame $A^3$. The binding-screws $m'$ $m^2$ and the block $m^4$ are insulated from the frame $A^3$ in the manner shown in Figs. 4 and 5. The lower end of the strip $M^2$ is adapted for contact with a strip $J^4$, carried by the armature $J^2$ and insulated therefrom, and the return-wire 2 of the outer circuit is connected with said strip $J^4$. A vertical strip $J^3$ is also supported on said insulating-block $m^4$, above referred to, and is adapted for contact with the strip $J^4$ on the side thereof opposite to the strip $M^2$ when the armature is swung toward its magnet. With this construction when the shaft I is shifted forwardly the locking-detent arm F is moved into locking engagement with the locking-wheel $D^5$ and the wheel D' is shifted laterally into engagement with the units-wheel of the cyclometer mechanism, which occurs upon the initial rotation of the starting-shaft B, (the parts being locked in this position.) The starting-circuit is closed from wire 1 through the magnet J', the strip $M^2$, the strip $J^4$, and back to line 2. When said magnet J' is energized through said starting-circuit, it acts to draw the armature $J^2$ away from the strip $M^2$ and breaks the starting-circuit at this point. The drawing of the armature toward the magnet in the manner described acts to release the lug $j'$ on said armature from the lug $i^2$ on one of the oscillating standards of the shaft I and permits said parts to be restored to their positions under the action of the spring $G^2$ and the bar G, and the spring $D^2$ of the shaft D thereafter acts to restore the said shaft to its starting position and to turn the wheel $D^6$, which constitutes part of the make-and-break device, as hereinbefore stated. At the time the starting-circuit is closed the transmitting-circuit is immediately opened in the manner described. Said transmitting-circuit is composed as follows: The spring-strips H H' of the make-and-break device are provided with tailpieces $h^5$ $h^6$, respectively. The tailpiece $h^5$ is connected by a wire $h^7$ with the upper end of the strip $J^3$, and said strip $J^3$ when the device is unlocked, as shown in Fig. 5, is electrically connected with line-wire No. 2 through the medium of the strip $J^4$, carried by the armature. The other tailpiece $h^6$ of the spring-strip H' of the make-and-break device is connected by a wire $h^8$ with wire No. 1. Therefore when the parts are unlocked by the drawing of the armature toward the electromagnet the circuit through the make-and-break device is closed between the strips $J^3$ and $J^4$, and this occurs at the instant the starting-circuit is opened between the strip $J^4$ and the strip $M^2$. In the subsequent rotation of the star-wheel of the make-and-break device the transmitting-circuit is intermittently opened and closed, thereby producing recording impulses which are sent through the line to the recorder at the central station and there translated into a graphic record.

When the apparatus is used in connection with a measured telephone service, it is desirable that a suitable signaling device be operated at each time a record is set up, so as to apprise the operator at the central station that a call has been recorded before the subscriber's telephone is connected with another telephone of the exchange. A signaling device for this purpose is herein shown consisting of a spiral gong N, which is located in the hollow base of the machine, Figs. 3 and 10. N' designates a hammer which is attached to a striking-arm $N^2$, and said hammer is normally held against the gong by means of a spiral contractile spring $N^3$. Said arm $N^2$ is rigidly fastened to the lower end of a vertical shaft $N^4$, which has bearing in the horizontal part of the base and in a suitable sleeve $n$, rising from the base. Said shaft is provided at its upper end with a crank-arm $N^5$, which is provided at its outer end with an upturned pin $n'$, which is located beneath the starting-shaft B. Said pin is adapted for contact with a cam $B^4$ on the shaft B, and said cam is so formed as to operate, through said crank, during the rotation of said shaft, to swing the hammer-arm N² away from the gong and to release said arm, so that it may thereafter swing the hammer N' forcibly against the gong through the action of the spring N³.

In addition to the record produced at the central station means are provided at the temporary recording device for producing a permanent record of the number of records set up on the temporary recording device. Said means consist of a computing-register O, Fig. 1, which is supported on a suitable bracket formed on or attached to one of the side frame members of the device, and the shaft B extends into and is connected in any suitable or familiar manner with the counting elements of said computing-register. With this construction each time the shaft B is turned it acts to operate said computing-register, and the records produced in said register are permanent and are not disturbed during the restoring movements of the temporary registering device.

The recording device at the central station, which is designated generally by the reference-letter R, may be of any preferred type and, as herein shown, consists of a familiar form of ticker consisting of a bipolar magnet R' and a pivoted armature R², which is normally drawn away from the magnet by a spring R³ and carrying at its end a pencil r, adapted for intermittent contact with a record-tape R⁴, wound from a roll R⁵. The tape is advanced between coacting rollers r' r², driven in any suitable manner, and is unwound over a table r⁴, upon which it rests when it receives the impressions from the pencil. The energizing of the magnet draws the pencil (or it may be a siphon-pen) down into contact with the record-tape, and the interruption of the current occurring at the break permits the pencil to be withdrawn by the spring.

In order to prevent the current of the operating-circuit or a foreign current from accidentally closing the starting-circuit, a safety device is bridged between the operating-circuit wires which is so constructed as to be operated by a current different from the operating-circuit or any probable foreign current which may find its way to the circuit. We have herein shown a safety device of this character which is actuated by a pulsating or interrupted current, and it includes as a part thereof an automatic switching mechanism which is so constructed and operated that the closing movement of the switch harmonizes with a pulsating or interrupted current of a given frequency and will not be operated by a current of a different character or frequency. Said safety device is illustrated in Figs. 12, 13, and 14 and is made as follows: The device is supported on a base P, which is provided with two vertical standards P' P', connected by a transverse bar P². P³ designates a bipolar electromagnet which is supported on said base at one side of and between said standards. P⁴ designates a segmental gear which is rotatively mounted on the cross-bar P² between said standards. P⁵ designates the armature of said electromagnet, which is pivotally mounted on the cross-bar P², said armature having bearing on each side of the gear-segment. The armature is provided with a rearwardly-extending arm P⁶, which is located near one side of the gear-segment P⁴ and parallel therewith and is provided at its rear end with a spring-pressed pawl p, which engages the marginal teeth of said gear-segment. P⁷ designates a spiral contractile spring, which is attached at its upper end to said arm P⁶ between said pawl and the cross-bar P² and at its lower end to the base and acts normally to hold said arm in its lowermost position. Said pawl is provided with a stop-pin p', which vibrates between two stop projections p² p³, located on a standard P⁸, rising from the base of the device at one side of the gear-segment P⁴. Q designates as a whole an escapement device having a gear-wheel Q', which meshes with the gear-segment P⁴. The said gear-segment is provided on one side thereof with two curved or crescent-shaped guides P⁹ P¹⁰, one of which carries a contact-piece p⁴. P¹¹ designates a vertical metallic contact-bar which is connected at its lower end with a binding-strip p¹⁴, attached to the base of the device, and is provided at its upper end with a laterally-turned part p⁶, which is directed toward the gear-segment P⁴. Said laterally-turned part of said contact-bar P¹¹ is adapted when the gear-segment is turned to the proper angular position on its axis of rotation to enter the space between the guides P⁹ P¹⁰, and when said laterally-turned part has entered said space and the gear-segment is restored said laterally-turned part of the bar has a wiping engagement with the contact-piece p⁴ on the guide P¹⁰ and closes a circuit through the starting-magnet J' of the temporary recording device. When a pulsating-current circuit is closed through the magnet P³, the armature is drawn toward the poles of the magnet, thereby swinging the rear end of its arm and pawl p, carried thereby, upwardly and rotating the gear-segment. The pulsations of the current cause said arm to swing rapidly to and fro on its axis, and owing to the escapement control of the gear-segment and the spring-pressure exerted on the arm said arm when the armature is released from the magnet-poles drops more rapidly than the gear-segment reverses, so that each time the arm is raised the pawl engages a tooth successively lower than in the last engagement, and thereby raises said gear-segment with a halting movement until the space between the guides P⁹ P¹⁰ is brought into line with the laterally-turned part of the contact-bar. When this occurs, said laterally-turned part of the bar springs into the space between the guides and in the next reverse movement of the segment engages the contact-piece $p^4$ on one of the said guides and closes the starting-circuit. A direct current does not operate the switch mechanism, for the reason that the armature is thereby attached to the poles of the magnet and is held down, and a pulsating current which does not harmonize with the mechanism does not produce the desired effect, as it does not swing the segment to the proper angular position for the laterally-turned part of the contact-bar to enter the space between the guides. The pulsating current may be produced by interrupting the starting-current, either by means of a manually-operated vibratory key or by means of a rotary commutator included in said circuit. The former method is herein shown and will be described in connection with the recording-circuit. After the starting-circuit has been closed through the pulsating-current-actuated device described means are provided for switching the pulsating current out of the line and switching the continuous recording-circuit in, so that the first recording impulse produced by the make-and-break device will be taken up by the recording-circuit, and thereby translated into a graphic record. The electrical connection between the parts of said safety device is as follows: The ends of the coils of the magnets $P^3$ are connected by wires $p^{10}$ $p^{11}$ with binding-screws $p^{12}$ $p^{13}$ which binding-screws are connected with line-wires 1 and 2. The binding-screw $p^{14}$ of the contact-bar is connected by a wire $p^{15}$ with the line-wire 1. The contact-piece $p^4$ on the segment is grounded to the base, and said base is provided with a binding-screw $p^{17}$, which is connected by a wire $p^{16}$ with one end of the coil of the starting-magnet J' of the temporary recording device.

In Fig. 16 is indicated in a diagrammatic manner a subscriber's telephone-circuit and the recording-circuit, including the parts at the subscriber's telephone and those at the central station. For sake of clearness only the parts necessary for an understanding of the circuits are illustrated, the mechanical details being omitted. The line-wires 1 and 2 of the circuit are connected with the usual spring-jack U of the switchboard at the central station. V V' designate, respectively, the magneto call-bells and an open generator, which are bridged between the lines in the usual manner; V², the transmitter included in the primary circuit; V³, the receiver included in the secondary circuit, and V⁴ the automatic switch by which the primary and secondary circuits are closed and which serves also as a support for the receiver in the usual manner. As shown in said figure, the magnet $P^3$ of the safety device is bridged between the wires 1 and 2, the wires 3 and 4 representing the wires $p^{10}$ $p^{11}$ and binding-screws $p^{12}$ $p^{13}$. $4^a$ indicates the armature of said magnet. In the diagram it is assumed that the contact-bar $P^{11}$ is brought into contact with the contact-piece $p^4$ directly by the movement of the armature, although in the detailed construction hereinbefore described such movement is effected by the movement of the gear-segment $P^4$. The contact-bar $P^{11}$ is shown in Fig. 15 as connected with the line-wire 1 by means of a wire 5, which corresponds in the detail construction to binding-screw $p^{14}$ and wire $p^{15}$. $5^a$ designates a wire leading from the contact-piece $p^4$ of said safety device to the electromagnet J', said wire $5^a$ corresponding with and representing the frame of the safety device, wire $p^{16}$, binding-screw $m$, and wire M, and 6 designates a wire leading from the opposite end of said electromagnet to the spring-strip M², said wire 6 representing wire M', binding-screw $m^2$, strip $m^3$, and wire $m^a$. The spring-strip $J^3$ is connected by a wire 7' with the strip H of the make-and-break device, said wire representing the wire $h^7$ and tailpiece $h^5$ of the detail construction, and the strip H' of said make-and-break device is connected by a wire 8 with wire 1 of the main circuit, said wire 8 representing wire $h^8$ and the tailpiece of the strip H'. The recording-circuit embraces wires 9 and 10, which are connected with a plug, (indicated diagrammatically at 11.) 12 is a battery in said circuit. 13 is a wire leading from one side of said battery through the magnets R' of the recording device to a contact-piece 14. 15 is a wire connected with the wire 13 on the same side of the battery as the recording device and is connected with one end of the coil of a magnet 16. The other end of said coil is connected by a wire 17 with a contact-piece 18, located opposite to the contact-piece 14. 19 is an armature which is pivoted at 20 and movable toward and from the magnet 16. The armature 19 is normally held away from its magnet 16 by means of a spring 23. When the armature is attracted to the magnet, it is held against the core of the magnet until manually released by a locking-lever 25, which is pivoted at its lower end to swing toward and away from the end of the armature when free and engages near its upper end the outer end of the armature. Said locking-lever is given a tendency to swing into its locking position beneath the armature with its upper end engaging the lower face of the armature by means of a spiral contractile spring 26, attached at one end to a stationary part of the apparatus and at its other end to the upper end of the locking-lever. The upper end of the locking-lever is rounded or tapered, so that when the armature is raised by the magnet the lever passes readily beneath the same with a wedging action and holds the armature against the core of its magnet against the action of the armature-retracting spring 23. The wire 9 is connected with the armature at its point of pivot 20, as herein shown, and the tailpiece 21 of said armature vibrates between said contact-pieces 14 and 18 and has alternate contact therewith. The wire 15 is broken by a vibratory switch-key 22. It is at the key 22 that the pulsating or interrupted current is produced which effects the operation of the safety device, whereby is closed the starting-circuit in the manner hereinbefore described. It will be understood that the plug 11 is separate and distinct from the operator's plug at central and is only inserted into the spring-jacks of the several operating-circuits when it is desired to take the records from the temporary recording devices located at the subscribers' stations or telephones.

The operation of setting up the records, whether they be automatically set up, as when registering the cycles or unit movements of a meter or the like, or whether they be manually set up by a telephone subscriber when a requested connection is being made, has been sufficiently explained hereinbefore. The operation of transmitting the temporary records to the central station and there translating them into graphic records may be briefly stated as follows: When the temporary records are to be taken off of a temporary registering device, the recording device is connected with the operating-circuit by inserting the plug 11 into the spring-jack U. Thereafter a pulsating or intermittent current is sent through the outer circuit for the purpose of actuating the safety device, and this is effected in the present instance by the key 22, though it may be otherwise effected, as by a rotary commutator mechanism. The pulsating-current circuit is at this time closed through line 17, contact-point 18, the armature 19, and line 9 to the magnet $P^3$ of the safety device, which latter is bridged across the line. The pulsating current acts to swing the gear-segment $P^4$ in a halting movement in the manner before described until the circuit is closed through the device between the bar $P^{11}$ and the contact-piece $p^4$. The armature 19 is not at this time attracted to its magnet 16, notwithstanding its relatively low resistance as compared with the magnet $P^3$ by reason of the fact, first, that the armature 19 is spaced farther from its magnet 16 than is the armature $4^a$ spaced from its magnet $P^3$, and, second, because the spring 23 acts in opposition to the attractive force of the magnet 16 and has sufficient tension to overcome such attractive force so long as the current from the battery 12 meets the resistance afforded by the magnet $P^3$. The circuit is closed but momentarily between the bar $P^{11}$ and the contact-piece $p^4$, but sufficiently long to energize the magnet J' of the temporary registering device. The circuit thus closed, which is the starting-circuit, includes the contact-strip $M^2$ and the strip $J^4$ of the armature $J^2$. As soon as the magnet J' is energized it draws the contact-strip $J^4$ from the contact-strip $M^2$ and holds it into contact with the strip $J^3$, thus opening the starting-circuit and closing the transmitting-circuit through the make-and-break device, which latter is operated through the medium of the star-wheel $D^6$, as before stated. As soon as the current is short-circuited around the safety or starting device magnet $P^3$, the resistance to the flow of the current is decreased and the additional flow of current through the magnet 16 acts to energize said magnet sufficiently to attract its armature 19 against the tension of the spring 23, whereby the tailpiece of said armature is swung away from the contact-piece 18 and into contact with the contact-piece 14. This operation closes the recording-circuit through the recording-magnets R' and opens the circuit through the magnet 16. When the armature 19 is drawn toward its magnet in this manner, the locking-lever 25 is operated in the manner before described to lock the armature in this position with its tailpiece in contact with the contact-piece 18, thereby maintaining the recording-circuit closed between said tailpiece and contact-piece until the locking-lever is manually released, notwithstanding the deënergizing of the magnet 16, which occurred when the tailpiece of the armature was swung out of contact with the contact-piece 18. Such switching of the pulsating current out of the circuit occurs instantly upon the closing of the circuit through the safety or starting device, so that the first recording impulse from the make-and-break device is passed through the recording device R' and is recorded. After the record is taken the plug 11 is withdrawn from the spring-jack U and thereafter the locking-lever 25 is swung out of its locking position, which is effected by a knob 27 thereon, thereby permitting the armature 19 to be swung away from the magnet 16 by the spring 23. In this manner the tailpiece of said armature is returned into contact with the contact-piece 18, so that in the subsequent manipulation of the key 22 the circuit is closed through the magnet 16 and around the recorded magnets, whereby the pulsating current which operates the safety device will have no effect on the recording device and said recording device will not be operated until the current is again short-circuited around the magnet of the starting or safety device.

It will be understood that in applying the apparatus to other uses which have been hereinabove mentioned the circuits will be varied to correspond with the changed conditions. It will be furthermore understood that many changes may be made in the details of the several parts of the apparatus without departing from the spirit of our invention, and we do not wish to be limited thereto, except as hereinafter made the subject of specific claims. In the practical instalment of the apparatus the temporary recording device and the safety device will be inclosed in a suitable case, which if used in connection with telephone service will be located at the subscriber's telephone.

We claim—

1. A registering device upon which individual registrations are severally set up and from which they are collectively transmitted, comprising a plurality of denomination counting members which are given a step-by-step advance movement as the registrations are set up, and means for transmitting the registrations from said device as the counting members are restored to zero, so constructed that each counting member produces during its retrograde movement a number of recording impulses representing a multiple or multiples of the denomination to which the counting member is appropriated.

2. A registering device upon which individual registrations are severally set up and from which they are collectively transmitted, comprising a plurality of denomination counting members which are given a step-by-step advance movement as the registrations are set up, means for transmitting the registrations from said device as the counting members are restored to zero, so constructed that each counting member produces in its retrograde movement a number of recording impulses representing a multiple or multiples of the denomination to which the counting member is appropriated, and means whereby the impulses produced by each counting member are of different duration from those produced by the other counting member or members.

3. A registering device upon which individual registrations are severally set up and from which they are collectively transmitted, comprising a plurality of denomination counting members which are given a step-by-step advance movement as the registrations are set up and means for transmitting from said device the registrations so set up on said counting members as the counting members are restored to zero, the parts being so constructed that each counting member acts in its retrograde movement to produce only a number of recording impulses equal to the number of steps required to return the same to zero, regardless of the number of advance movements which it has made while the temporary registrations are being set up.

4. A registering device upon which individual registrations are severally set up and from which they are collectively transmitted, comprising a plurality of counting members appropriated to different denominations, the member appropriated to the lowest denomination being advanced step by step as the registrations are set up and the member of the next higher denomination being advanced a step at the completion of each cycle of movement of said lowest denomination member, and means for transmitting the registrations from the device as the counting members are restored to zero and so constructed that each counting member acts in its retrograde movement to produce only a number of recording impulses equal to the number of steps required to return it to zero, regardless of the number of advance movements which it has made while the registrations are being set up.

5. A registering device upon which individual registrations are severally set up and from which they are collectively transmitted, comprising a plurality of denomination counting mechanisms which are given a step-by-step movement as the registrations are set up, and an electric make-and-break device which is operated to send out recording impulses as the counting mechanisms are restored to zero, and means so operating that each counting mechanism produces in its retrograde movement a number of impulses representing a multiple or multiples of the denomination to which the counting mechanism is appropriated.

6. A registering device upon which individual registrations are severally set up and from which they are collectively transmitted, comprising a plurality of denomination members which are given a step-by-step movement as the registrations are set up, and an electric make-and-break device which is operated to send out recording impulses as the counting members are restored to zero, so constructed that each counting member acts in its retrograde movement to produce only a number of recording impulses equal to the number of steps required to restore it to zero, regardless of the number of advance rotations which it has made while the temporary registrations were being set up.

7. An apparatus for the purpose set forth comprising a registering device located at an outlying station upon which registrations are adapted to be severally made, an electrically-actuated recording device located at a central station, electrical connections between said registering and recording devices, so operating that records transmitted to the central recording device are designated by differentiated characters, the characters of the several kinds being appropriated to the several denominations composing the number representing the record produced at the central device.

8. An apparatus for the purpose set forth comprising a registering device located at an outlying station and upon which registrations are adapted to be severally made, an electrically-actuated recording device located at a central station, electrical connection between said registering and recording devices, and means so operating that the registrations transmitted to the central recording device are designated by differentiated characters, the characters of each kind being appropriated to a particular denomination and of a number representing a multiple or multiples of each denomination.

9. An apparatus for the purpose set forth comprising a registering device located at an outlying station upon which registrations are severally set up and from which they are collectively transmitted, a recording device located at a central station, electrical connections between said registering and recording devices, said registering device comprising a plurality of denomination counting members which are given a step-by-step advance movement as the registrations are set up and means for electrically transmitting the registrations to the central device as the counting members are restored to zero, and so constructed that each counting member produces at the central recording device in its retrograde movement a number of record characters representing a multiple or multiples of the denomination to which the counting member is appropriated.

10. A registering device upon which individual records are severally set up and from which they are collectively transmitted, comprising a plurality of toothed denomination-wheels which are advanced step by step as the registrations are set up, a toothed wheel adapted to mesh with said denomination-wheels and to be advanced thereby, a restoring-spring for said toothed wheel, means for shifting the toothed wheel into mesh successively with the denomination-wheels, beginning with the lowest denomination, as the registrations are set up, means for shifting the toothed wheel backwardly into mesh with denomination-wheels as the latter are restored to zero, and an electrical transmitting device operated by said toothed wheel during the restoring movement thereof.

11. A registering device upon which individual registrations are severally set up and from which they are collectively transmitted, comprising a plurality of toothed denomination-wheels, which are advanced step by step as the registrations are set up, a toothed wheel adapted to mesh with said denomination-wheels and to be advanced thereby, a restoring-spring for said toothed wheel, means for shifting the toothed wheel into mesh successively with the denomination-wheels, beginning with the lowest denomination and just before each wheel completes its rotation as the records are being set up, means for shifting said toothed wheel backwardly into mesh with said denomination-wheels, said shifting occurring at the time the wheels are severally restored to zero, and an electrical transmitting device operated by said toothed wheel during the restoring movement thereof.

12. A registering device upon which individual registrations are severally set up and from which they are collectively transmitted, comprising a plurality of toothed denomination-wheels which are advanced step by step as the registrations are set up, a toothed wheel adapted to mesh with said denomination-wheels and adapted to be advanced thereby, a restoring-spring for said toothed wheel, means for shifting the toothed wheel into mesh successively with the denomination-wheels, beginning with the lowest denomination, as the records are set up, means for shifting the toothed wheel backwardly into mesh with the denomination-wheels as the latter are returned to zero, a star-wheel movable with said toothed wheel, an electrical transmitting device operated by said star-wheel, and means operated by said denomination-wheels for controlling the recording movements of said toothed wheel.

13. A registering device upon which individual registrations are severally set up and from which they are collectively transmitted, comprising a plurality of toothed denomination-wheels which are advanced step by step as the registrations are set up, a toothed wheel adapted to mesh with said denomination-wheels and adapted to be advanced thereby, a restoring-spring for said toothed wheel, means for shifting the toothed wheel into mesh successively with the denomination-wheels, beginning with the lowest denomination, as the registrations are set up, means for shifting the toothed wheel backwardly into mesh with the denomination-wheels as the latter are restored to zero, a star-wheel which partakes of the rotative and shifting movement of the toothed wheel, an electrical make-and-break device operated by said star-wheel, means operated by said denomination-wheels in their retrograde movement for controlling the recording movements of said toothed wheel, and contact-pieces on said make-and-break device equal in number to that of the denomination-wheels and adapted for contact by the teeth of the star-wheel, and made of varying lengths, said star-wheel being shifted from one contact-piece to the other as the toothed wheel is shifted from one denomination-wheel to the other.

14. A registering device upon which individual registrations are severally set up and from which they are collectively transmitted, comprising a counting mechanism which is advanced step by step as the registrations are set up and restored as the registrations are transmitted therefrom, and means for transmitting the records from the device comprising a star-wheel which is rotated during the retrograde movement of the counting mechanism, a make-and-break device operated by the star-wheel, laterally-separated contact-pieces on said make-and-break device, appropriated each to a separate denomination and with which the teeth of the star-wheel have contact, and means for shifting the star-wheel laterally during its retrograde movement to bring it successively into line with the contact-pieces.

15. A registering device upon which individual registrations are severally set up as they are made and from which they are collectively transmitted, comprising a plurality of toothed denomination-wheels which are advanced step by step as the registrations are set up, a toothed wheel adapted to mesh with said denomination-wheels and to be advanced thereby, a restoring-spring for said toothed wheel, means for shifting said toothed wheel into mesh successively with said denomination-wheels, beginning with the lowest denomination, as the registrations are set up, stops acting to temporarily prevent the shifting of said toothed wheel backwardly, said stops being controlled by parts on the denomination-wheels which operate to release the toothed wheel when such denomination-wheels are returned to their zero or starting positions, and an electrical transmitting device operated by the toothed wheel during the restoring movement thereof.

16. A registering device upon which individual registrations are severally set up and from which they are collectively transmitted, comprising a plurality of denomination-wheels which are advanced step by step as the registrations are set up, a toothed wheel adapted to mesh with said denomination-wheels and to be angularly advanced thereby, means for restoring said toothed wheel, means for shifting said toothed wheel laterally into successive engagement with the denomination-wheels, beginning with the lowest denomination, as the registrations are set up, means for shifting the toothed wheel backwardly into mesh with said denomination-wheels during the restoring movement thereof, stop-levers associated one with each denomination-wheel and operated at the first advance step of the denomination-wheel to swing a part thereof into the path of a part carried by said toothed wheel, the parts being so constructed that in the restoring movement of the denomination-wheels the lever associated with each wheel is actuated to move the lever out of the path of said part movable with the toothed wheel when the denomination-wheel reaches zero, and an electrical transmitting device operated by said toothed wheel during the restoring movement thereof.

17. A registering device upon which individual registrations are severally set up and from which they are collectively transmitted, comprising a plurality of denomination-wheels, which are advanced step by step as the registrations are set up, a toothed wheel which meshes with said denomination-wheels and which is angularly advanced thereby, means for moving said toothed wheel laterally into mesh with the several denomination-wheels, beginning with the lowest denomination, as the records are set up, a lever associated with each denomination-wheel, projections on each denomination-wheel adapted to engage its lever and to throw a part of said lever into the path of an arm carried by said toothed wheel to temporarily prevent retraction of said toothed wheel, means operating to laterally shift said toothed wheel backwardly into mesh with the several denomination-wheels during the restoring movement thereof, means acting to throw said stop-levers out of the path of the arm moving with said toothed wheel at the time the denomination-wheel associated therewith is returned to zero, and an electrical transmitting device operated by said toothed wheel during its retrograde movement.

18. A registering device upon which individual registrations are set up and from which they are collectively transmitted, comprising a plurality of counting members which are advanced step by step as the registrations are set up, a toothed wheel adapted to mesh severally with said counting members and to be advanced thereby, a restoring-spring for said toothed wheel, means for successively shifting said toothed wheel laterally into engagement and holding it in mesh with the counting members as the registrations are set up, comprising a spring acting laterally against said wheel, a shiftable spring-pressed abutment against which the wheel is held by the spring during the cycle of movement of each counting member as the wheel meshes therewith, and permitting the wheel to shift at the end of such cycle of movement to the counting member of the next higher denomination, means coöperating with said spring-pressed abutment for laterally retracting said toothed wheel, stops for controlling the lateral retractive movement of the toothed wheel to hold the same in mesh with each counting member during its angular restoring movement, and a transmitting device operated by said toothed wheel.

19. A registering device upon which individual registrations are set up and from which they are collectively transmitted, comprising a plurality of counting members which are advanced step by step as the registrations are set up, a toothed wheel adapted to mesh severally with said counting members and to be advanced thereby, a restoring-spring for said toothed wheel, means for successively shifting said toothed wheel laterally into engagement and holding it in mesh with the counting members as the registrations are set up, comprising a spring acting laterally against said wheel, a spring-pressed, endwise-movable shaft parallel with the axis of rotation of said toothed wheel, an arm on said shaft which engages a part laterally movable with said toothed wheel, means whereby the rotation of the toothed wheel constantly shifts said shaft endwise, means acting to arrest the toothed wheel in mesh with each counting member during a complete cycle thereof, the arm of the endwise-movable shaft during such time moving away from said part laterally movable with the toothed wheel, means acting to shift laterally the toothed wheel at the end of each cycle of the counting member with which it is in mesh into mesh with the counting member of the next higher denomination, said toothed wheel being arrested by said arm of the shaft in line with such next higher counting member, means for laterally retracting said toothed wheel during the angular restoring movement thereof into mesh successively with the counting members, and a transmitting device operated by said toothed wheel during its restoring movement.

20. A registering device upon which individual registrations are set up and from which they are collectively transmitted, comprising a plurality of counting members which are advanced step by step as the registrations are set up, a toothed wheel adapted to mesh severally with said counting members and to be advanced thereby, a restoring-spring for said toothed wheel, means for successively shifting said toothed wheel laterally into engagement and holding it in mesh with the counting members as the registrations are set up, comprising a spring acting laterally against said wheel, an endwise-movable, spring-pressed shaft which moves constantly endwise in the direction toward which the toothed wheel is shifted as the records are set up, an arm on the shaft which engages a part which is shiftable laterally with said toothed wheel, a laterally-facing cam which rotates with said toothed wheel, a part on said endwise-movable shaft which engages said cam, stops controlling the lateral retractive movement of the toothed wheel to hold the same properly in mesh with the counting members, and a transmitting device operated by the said toothed wheel during its restoring movement.

21. A registering device upon which individual registrations are set up and from which they are collectively transmitted, comprising a plurality of toothed counting-wheels which are advanced step by step as the registrations are set up, a toothed wheel adapted to mesh severally with said counting-wheels, a rotative shaft with which said toothed wheel rotates and on which it shifts laterally so as to mesh with the counting-wheels, an endwise-movable, spring-pressed shaft parallel with said toothed wheel-shaft, said latter shaft being provided with a screw-thread, an arm or projection on the endwise-movable shaft adapted to engage said screw-thread, whereby the latter shaft is moved endwise as the other shaft is rotated, a spring for shifting the toothed wheel successively into engagement with the counting-wheels as the registrations are set up, an arm on the endwise-movable shaft which engages a part laterally movable with said toothed wheel, and against which said part is pressed by said spring, a laterally-facing cam rotative with said toothed wheel having a pitch like that of the screw-thread of the toothed wheel-shaft, a part on the endwise-movable shaft which engages said cam whereby the toothed wheel is held in mesh severally with the counting-wheels, notwithstanding the endwise movement of said endwise-shiftable shaft, means for laterally restoring said toothed wheel, means acting to arrest said wheel in mesh with the counting-wheels while said toothed wheel is angularly restored, and a transmitting device operated by said toothed wheel during its angular restoring movement.

22. A registering device upon which individual registrations are set up and from which they are collectively transmitted, comprising a plurality of toothed counting-wheels which are advanced step by step as the registrations are set up, a rotary shaft parallel with the axis of rotation of said wheels, a laterally-shiftable, toothed wheel non-rotative on said shaft adapted to mesh severally with the counting-wheels as the registrations are set up, a spring for angularly restoring said shaft, an endwise-shiftable, spring-pressed shaft parallel with and movable toward and from the rotative shaft, a spring for laterally shifting the toothed wheel into mesh successively with the counting-wheels, an arm on said endwise-shiftable shaft which engages a part laterally shiftable with the toothed wheel, and which acts as a stop to arrest the toothed wheel in mesh with each counting-wheel, an arm on said shiftable shaft adapted to engage a screw-thread on said rotative shaft, whereby rotation of the latter shaft imparts endwise movement to the other shaft, a laterally-facing cam movable with the toothed wheel, a projection on the endwise-movable shaft adapted to engage said cam and acting against said lateral shifting spring of the toothed wheel during the rotation of the counting-wheel with which the toothed wheel is in mesh and constructed to permit the toothed wheel to shift at the completion of such rotation to the counting-wheel of the next higher denomination, means for swinging the endwise-shiftable shaft toward the rotative shaft to bring the arm thereon into engagement with the screw on said rotative shaft and to bring said projection into line with said cam, a notched wheel on said rotative shaft, a detent-arm adapted to be thrown into engagement with said wheel when the endwise-movable shaft is swung toward the other shaft, means for locking the parts in these positions and adapted to be released when the registrations set up are to be transmitted, and means for transmitting the set-up registrations from the device during the restoring movements of the parts.

23. An apparatus for the purpose set forth comprising a registering device located at an outlying station upon which individual registrations are severally set up and from which they are collectively transmitted, a recording device located at a central station, and electrical connections between said outlying and central recording devices, said registering device comprising a plurality of denomination counting members which are given a step-by-step advance movement as the records are set up, means acting during the retrograde movement of each counting member, to send out to the central recording device a number of recording impulses equal to the number of steps required to return said member to zero, and means for producing at the central recording device record characters from each denomination member which are differentiated from the record characters of the other member or members.

24. An apparatus for the purpose set forth comprising a registering device located at an outlying station upon which individual registrations are severally set up and from which they are collectively transmitted, a recording device located at a central station, and electrical connections between said registering and recording devices, said registering device comprising a counting mechanism which is advanced step by step as records are set up and which is restored to transmit the records therefrom, the transmitting mechanism embracing a make-and-break device and a star-wheel for operating the same, laterally-separated contact-pieces on the make-and-break device appropriated each to a separate denomination and with which the teeth of the star-wheel have contact in the rotation of said wheel, and means for laterally shifting the star-wheel during its rotary movement to bring it successively into line with the several contact-pieces.

25. An apparatus for the purpose set forth comprising a registering device upon which individual registrations are severally set up and from which they are collectively transmitted, a recording device located at a central station, and electrical connections between said registering and recording devices which are set in operation to transfer the registrations from the registering device to the recording device, and a safety device included in the circuit between the registering and recording devices and controlling the starting of the registering device, said safety device being operated by a current of a character different from that of the operating-circuit.

26. An apparatus for the purpose set forth, comprising a registering device upon which individual registrations are severally set up and from which they are collectively transmitted, a recording device located at a central station, an operating-circuit connecting said registering and recording devices over which the registrations are transmitted to the recording device, a source of continuous current for operating said recording device, a safety device controlling the starting of the registering device, and a source of pulsating current for operating said safety device.

27. An apparatus for the purpose set forth, comprising a registering device upon which individual registrations are set up and from which they are collectively transmitted, a recording device located at a central station, an operating-circuit connecting said registering and recording devices over which said registrations are transmitted to the recording device, said operating-circuit embracing a starting-circuit at the registering device which is normally open and a safety device bridged between the wires of the operating-circuit between said registering and recording devices and operating to close said starting-circuit, said safety device being operated by a current different in character from that of the operating-circuit.

28. An apparatus for the purpose set forth comprising a registering device upon which individual registrations are severally set up and from which they are collectively transmitted, a recording device located at a central station, an operating-circuit connecting said registering and recording devices over which the registrations are transmitted to the recording device, said operating-circuit embracing a starting-circuit at the registering device which is normally open, a source of continuous current included in said operating-circuit for operating said registering device to transmit registrations from the registering device to the recording device and there translate them into a graphic record, a safety device in said circuit for controlling the starting of the registering device, means for producing in said operating-circuit a pulsating current for operating the safety device to close the starting-circuit, and means for switching the pulsating current from said circuit when the starting-circuit is closed and for closing the recording devices to the source of continuous current.

29. The combination with an operating-circuit, a source of continuous current in said circuit and an electrically-actuated device also included in said circuit and operated by a continuous current, and means for closing said circuit, of a safety device included in said circuit for controlling the operation of said electrically-actuated device and a source of pulsating current for operating said safety device.

30. In a telephone-recorder, a registering device, comprising counting members of different denominations, means for stepping forward the units-counting member as the registrations are made, associated means operating in a like manner the counting members of higher denominations from the units-counting member, a recording device and means for transmitting the registrations, so constructed that as each counting member is retracted it transmits to the recording device a number of impulses, representing a multiple or multiples of the denomination to which it is appropriated.

31. In an electrical recorder, means for registering thereon by unit tallies, associated means for registering definite groups of unit tallies in units of higher denominations, means for taking a reading of the accumulated tallies in groups of units, one group for each denomination, transmitting mechanism constructed to translate the tallies of the several groups in impulses of varying duration and an electric circuit over which the reading is sent by the transmitting device.

32. The combination with a registering device comprising a plurality of interacting counting members appropriated severally to different denominations, and a recording device, of means for transmitting registrations from said counting members to the recording device including means operating to transmit from the several counting members differentiated characters, the characters of each kind being appropriated to a single counting member.

In testimony that we claim the foregoing as our invention we affix our signatures, in presence of two witnesses, this 20th day of January, A. D. 1903.

JAMES A. KENNY.
CHESTER H. THORDARSON.

Witnesses:
WILLIAM L. HALL,
GEORGE R. WILKINS